United States Patent
Zhang et al.

(10) Patent No.: US 10,084,381 B2
(45) Date of Patent: Sep. 25, 2018

(54) DCR INDUCTOR CURRENT-SENSING IN FOUR-SWITCH BUCK-BOOST CONVERTERS

(71) Applicant: Linear Technology Corporation, Milpitas, CA (US)

(72) Inventors: Xu Zhang, Milpitas, CA (US); Jian Li, San Jose, CA (US); Zhouyuan Shi, Fremont, CA (US); Yi Ding Gu, Pleasanton, CA (US)

(73) Assignee: LINEAR TECHNOLOGY LLC, Milpitas, CA (US)

( * ) Notice: Subject to any disclaimer, the term of this patent is extended or adjusted under 35 U.S.C. 154(b) by 0 days.

(21) Appl. No.: 15/654,568

(22) Filed: Jul. 19, 2017

(65) Prior Publication Data

US 2017/0324331 A1 Nov. 9, 2017

Related U.S. Application Data

(62) Division of application No. 14/677,794, filed on Apr. 2, 2015, now Pat. No. 9,748,843.

(60) Provisional application No. 62/054,587, filed on Sep. 24, 2014.

(51) Int. Cl.
*G06F 1/00* (2006.01)
*H02M 3/158* (2006.01)
*H02M 1/00* (2006.01)

(52) U.S. Cl.
CPC .. *H02M 3/1582* (2013.01); *H02M 2001/0009* (2013.01)

(58) Field of Classification Search
CPC ....... H02M 3/1582; H02M 2001/0009; H02M 3/156
USPC ................. 323/259, 282, 344, 286
See application file for complete search history.

(56) References Cited

U.S. PATENT DOCUMENTS

| | | | |
|---|---|---|---|
| 7,196,499 B1 | 3/2007 | Lipcsei | |
| 8,072,200 B1 | 12/2011 | Qiu et al. | |
| 2006/0261860 A1* | 11/2006 | Yamada | H02M 3/156 327/77 |
| 2009/0051334 A1* | 2/2009 | Huang | H02M 1/14 323/247 |
| 2010/0033145 A1* | 2/2010 | Tseng | H02M 3/156 323/282 |

(Continued)

FOREIGN PATENT DOCUMENTS

WO 2012/109680 A1 8/2012

OTHER PUBLICATIONS

EP Article 94(3) Notice, dated Aug. 9, 2017.

*Primary Examiner* — Alex Torres-Rivera
(74) *Attorney, Agent, or Firm* — Edward C. Kwok, Esq.; VLP Law Group, LLP (57) ABSTRACT

An inductor current-sensing circuit for measuring a current in an inductor includes (a) a first RC network coupled between a first terminal of the inductor and a reference voltage source; and (b) a second RC network coupled between a second terminal of the inductor and the reference voltage source. The first RC network and the second RC network each have a time constant substantially equal to the ratio between the inductance and the DC resistance of the inductor. The inductor which current is being measured may be a primary inductor of a four-switch buck boost converter receiving an input voltage and providing an output voltage.

25 Claims, 5 Drawing Sheets

(56) References Cited

U.S. PATENT DOCUMENTS

2013/0015830 A1* 1/2013 Zhang .................... H02M 1/14
                                                    323/282
2013/0249518 A1* 9/2013 Giannopoulos ....... H02M 3/156
                                                    323/284
2013/0307511 A1   11/2013 DeVries
2015/0364995 A1* 12/2015 Chen .................... H02M 3/158
                                                    323/271

* cited by examiner

DCR INDUCTOR CURRENT-SENSING IN FOUR-SWITCH BUCK-BOOST CONVERTERS

CROSS REFERENCE TO RELATED APPLICATIONS

The present application is a divisional patent application of copending U.S. patent application ("Copending Application"), Ser. No. 14/677,794, entitled "DCR Inductor Current-Sensing for Four-Switch Buck-Boost Converters," filed on Apr. 2, 2015, which is related to and claims priority of U.S. provisional patent application ("Copending Provisional Application I"), Ser. No. 62/054,587, entitled "DCR inductor current sensing for 4 switch buck-boost converters," filed on Sep. 24, 2014. The disclosures of both the Copending Provisional Application I and the Copending Application are hereby incorporated by reference in their entireties.

The present application is also related to U.S. provisional patent application ("Copending Provisional Application II"), Ser. No. 62/088,433, entitled "Peak-Buck Peak-Boost Current-Mode Control for Switched Step-up Step-down Regulators," filed on Dec. 5, 2014. The disclosure of the Copending Provisional Application II is hereby incorporated by reference in its entirety.

BACKGROUND OF THE INVENTION

1. Field of the Invention

The present invention relates to measuring an inductor current in a four-switch buck-boost power converter. In particular, the present invention relates to measuring inductor current using an RC circuit referenced to a virtual ground.

2. Discussion of the Related Art

Four-switch buck-boost power converters are used in many different applications. Such a power converter regulates an output voltage which may be higher than, equal to or lower than the input voltage. A typical four-switch buck-boost power converter has a single inductor and operates synchronously to provide high efficiency over a wide range of load currents. In a power converter, to provide over-current protection, discontinuous-mode operation or current loop regulation, inductor current-sensing is normally required. However, in a four-switch buck-boost power converter, current sensing is made difficult by the high common-mode noise that is often present on both terminals of the inductor.

Figure 1:
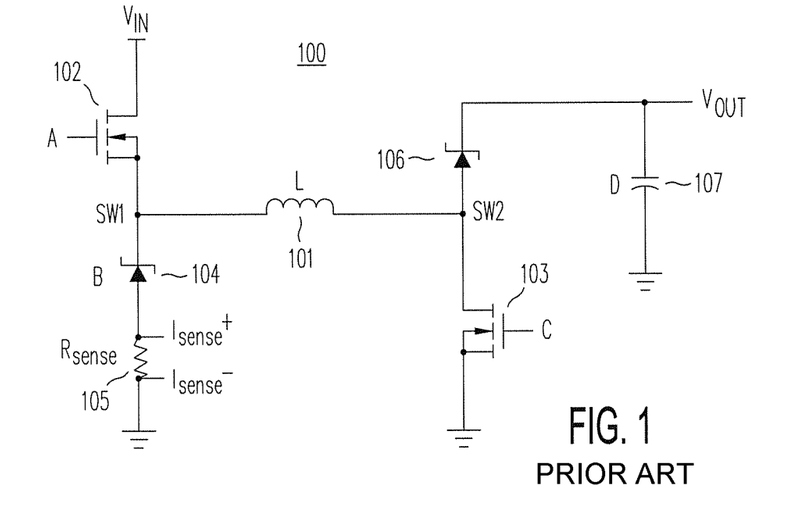
FIG. 1 shows a first current-sensing technique using sensing resistors in power converter 100.

FIG. 1 shows a first current-sensing technique using sensing resistors in power converter 100. Such a technique is used, for example, in the LM5118 and LM25118 circuits available from Texas Instruments, Inc., Dallas, Tex. As shown in FIG. 1, power converter circuit 100 includes inductor 101, diode 104, sensing resistor 105 and switches 102 and 103. Sensing resistor 105, which is connected in series with diode 104 to one terminal of inductor 101, senses the current in inductor 101 when (and only when) diode 104 is conducting. However, such a configuration cannot sense the peak current in inductor 101.

Figure 2:
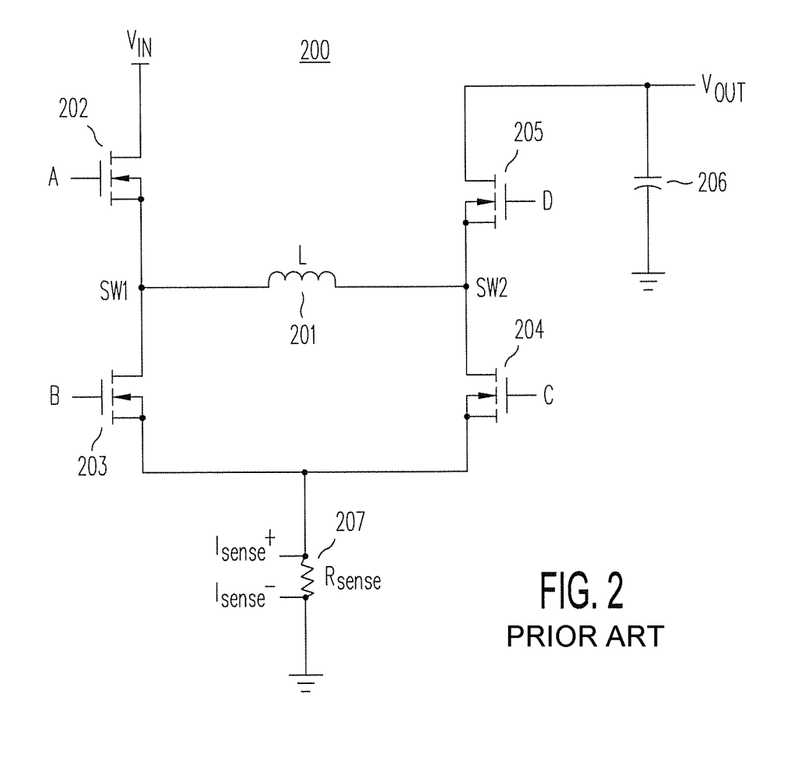
FIG. 2 shows another inductor current-sensing technique in four-switch power converter 200.

FIG. 2 shows another inductor current-sensing technique in four-switch power converter 200. Four-switch power converter 200 includes inductor 201, switches 202-205, output capacitor 206 and sensing resistor 207. Sensing resistor 207 senses a valley inductor current in "buck" mode (i.e., when switch 205 is maintained in a constant "on" state) and senses a peak inductor current in "boost" mode (i.e., switch 202 is maintained in a constant "on" state). This current-sensing technique is used in the LTC3780, LTC3789, LT3791, LT8705 circuits available from Linear Technology Corporation, Milpitas, Calif.

The technique of FIGS. 1 and 2 has two drawbacks. First, both sensing resistor 105 of FIG. 1 and sensing resistor 207 of FIG. 2 sense only a portion of their respective inductor currents, as each sensing resistor relies on a switch configuration that allows a current flowing in the respective inductor to flow through the sensing resistor. Second, sensing resistor 105 of FIG. 1 and sensing resistor 207 of FIG. 2 both dissipate power, which may lead to thermal issues in the respective circuits. At the same time, using high-power, precision sensing resistors increases system cost and circuit footprint.

Figure 3:
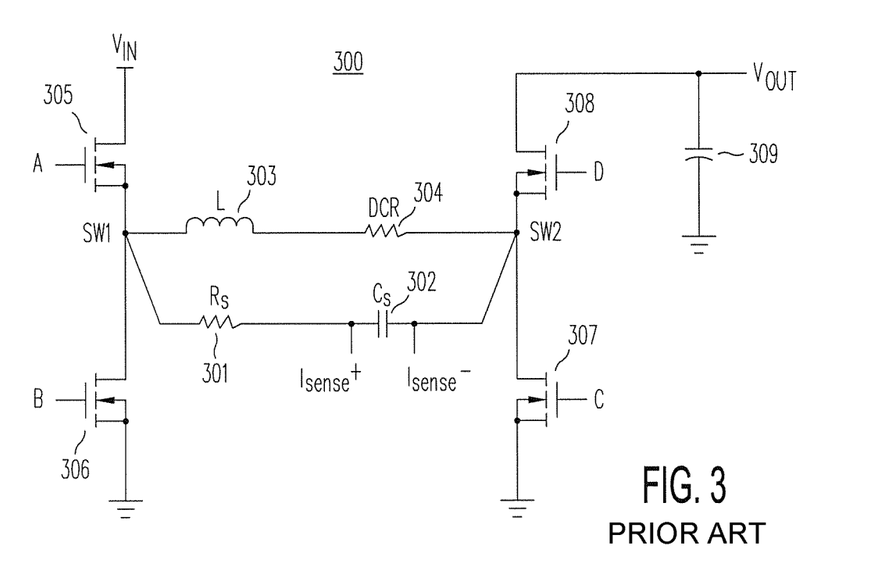
FIG. 3 shows one example of the DCR current sensing scheme in a four-switch buck-boost converter 300.

Another current-sensing method, referred to as the "DCR inductor current-sensing scheme" has been widely used in buck or boost converters. FIG. 3 shows one example of the DCR current sensing scheme in a four-switch buck-boost converter 300. As shown in FIG. 3, four-switch buck-boost converter 300 includes switches 305-308, inductor 303 and output capacitor 309. The equivalent DC resistance $R_{DCR}$ of inductor 303 is represented by DCR resistor 304 in FIG. 3. The current in inductor 303 is sensed by providing series-connected sensing resistor 301 and sensing capacitor 302 in parallel to inductor 303 (and equivalent DCR resistor 304). The DCR inductor current-sensing scheme attempts to match the time constant of inductor current $i_L$, given by the ratio of inductance L of inductor 303 to its equivalent DC resistance $R_{DCR}$ (i.e., $L/R_{DCR}$), by the product of resistance $R_s$ of sensing resistor 301 and capacitance $C_s$ of sensing capacitor 302. Under this scheme the sensed voltage $V_{sense}$ across sensing capacitor 302 is proportional to the product of inductor current $i_L$ and DC resistance $R_{DCR}$ (i.e., $V_{sense} = i_L * R_{DCR}$). However, as explained in the article "10 MHz Current Mode 4 Switch Buck Boost Converter (4SBBC) for Polar Modulation," by Park et al., published in the *Proceedings of the 23$^{rd}$ Annual Applied Power Electronics Conference*, pp-1977-83, the rail-to-rain common mode voltage range and the high common mode noise in the sensed voltage, due to switching in the converter output switches, make the current-sensing circuit complicated and very difficult to implement.

SUMMARY

According to one embodiment of the present invention, an inductor current-sensing circuit for measuring a current in an inductor includes (a) a first RC network coupled between a first terminal of the inductor and a reference voltage source; and (b) a second RC network coupled between a second terminal of the inductor and the reference voltage source. The first RC network and the second RC network each have a time constant substantially equal to the ratio between the inductance and the DC resistance of the inductor. The inductor which current is being measured may be a primary inductor of a four-switch buck boost converter receiving an input voltage and providing an output voltage.

In one embodiment, the reference voltage source provides a virtual ground reference, which may be connected to a system ground reference through a decoupling capacitor. The virtual ground reference may refer to the output voltage, the input voltage, and an average between the voltages across the inductor, when the four-switch buck boost converter operates in a buck mode, a boost mode and a buck-boost mode, respectively.

In one embodiment, the inductor current-sensing circuit may further include a third sensing capacitor connected between the first RC network and the second RC network, with the third sensing capacitor having a greater capacitance than each of the effective capacitances of the first and the second RC networks.

According to another embodiment of the present invention, an inductor current-sensing circuit for measuring a current in an inductor includes: (a) a sensing resistor connected in series with the inductor; (b) a first RC network coupled between a first terminal of the sensing resistor and a reference voltage source; and (c) a second RC network coupled between a second terminal of the sensing resistor and the reference voltage source. The first RC network and the second RC network may each have a time constant substantially equal to the ratio between the inductance of the inductor and the DC resistance of the inductor. The first and second RC network may each include (a) a sensing capacitor; (b) a first resistor coupled between a terminal of the sensing resistor and a first terminal of the sensing capacitor; a blocking capacitor coupled at one terminal to one terminal of the inductor; and a second resistor coupled between the first terminal of the sensing capacitor and the other terminal of the blocking capacitor. The ratio in resistance value between the second resistor of the second RC network and the first resistor of the second resistor network less one may be substantially the ratio in resistance value between the sensing resistor and the equivalent DC resistance of the inductor. The blocking capacitor in each of the first and second RC networks may have a capacitance that is greater than the capacitance of the sensing capacitor in the corresponding one of the first and second RC networks.

An inductor current sensed using a method of the present invention may be used to control switching in a four-switch buck boost converter. An example of such control may be found, for example, in the Copending Provisional Patent Application II.

The present invention is better understood upon consideration of the detailed description below in conjunction with the accompanying drawings.

BRIEF DESCRIPTION OF THE DRAWINGS

In these figures, like elements are assigned like reference numerals.

DETAILED DESCRIPTION OF THE PREFERRED EMBODIMENTS

Figure 4:
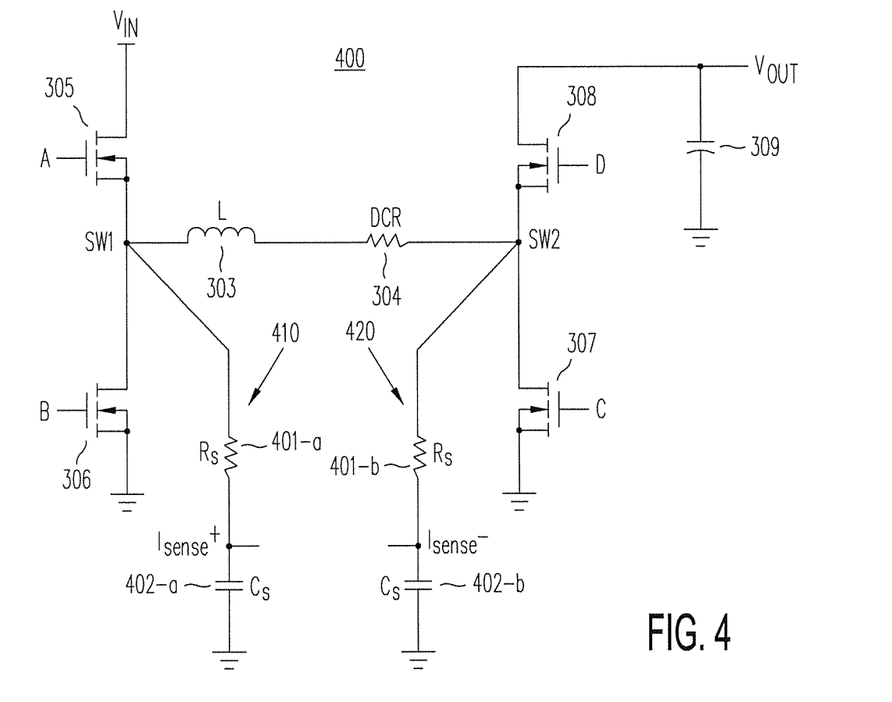
FIG. 4 shows four-switch buck boost converter 400 implementing a DCR current-sensing method in accordance with one embodiment of the present invention.

FIG. 4 shows four-switch buck boost converter 400 implementing a DCR current-sensing method in accordance with one embodiment of the present invention. In contrast with four-switch buck boost converter 300 of FIG. 3, which provides sensing resistor 301 and sensing capacitor 302 in parallel to inductor 303, four-switch buck boost converter 400 provides RC filters 410 and 420, consisting of sensing resistor 401-$a$ and sensing capacitor 402-$a$ and sensing resistor 401-$b$ and sensing capacitor 402-$b$, respectively. The sensed voltage across nodes $I_{sense+}$ and $I_{sense-}$ in RC filters 410 and 420, respectively, represent the differential voltage across switching nodes SW1 and SW2. By matching the time constant $L/R_{DCR}$ to the time constant $R_sC_s$ in each of RC filters 410 and 420, the sensed voltage $V_{sense}$ is directly proportional to the inductor current $i_L$ and DC resistance $R_{DCR}$ of inductor 303 and $V_{sense}=I_{sense+}-I_{sense-}=i_L*R_{DCR}$ (see FIG. 4).

In the embodiment of FIG. 4, lossless full-inductor current-sensing is achieved without high common-mode noise. However, sensing capacitors 402-$a$ and 402-$b$ should be kept very well-matched, so as to eliminate any transient differential error. Such matching may be achieved, for example, by fabricating both sensing capacitors on the same silicon substrate. Also, the DC bias voltages at sensing capacitors 402-$a$ and 402-$b$ vary according to the input and output voltages. Preferably, sensing capacitors 402-$a$ and 402-$b$ should be implemented by capacitors with low voltage coefficients, so as to maintain the matched time constants over wide voltage range.

Figure 5:
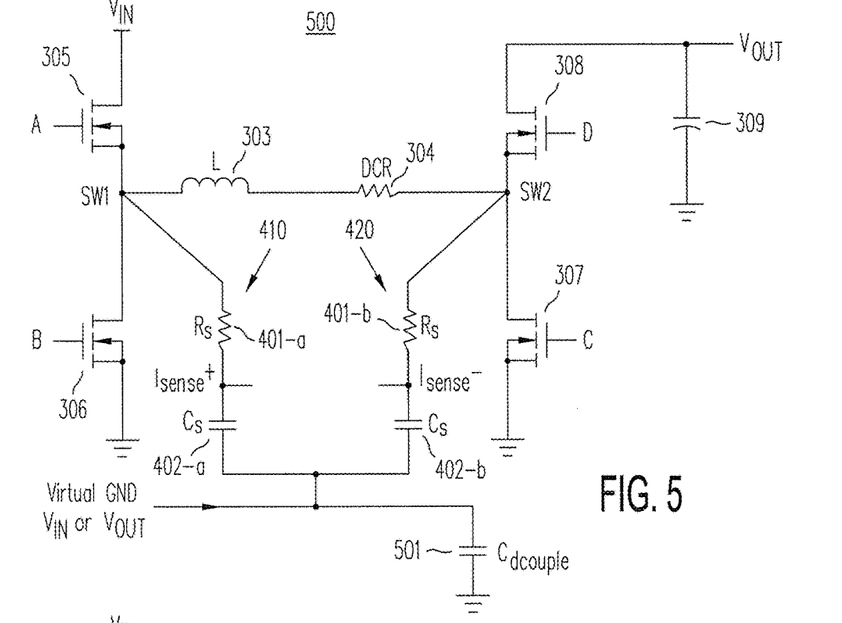
FIG. 5 shows four-switch buck boost converter 500 which eliminates DC bias voltages at sensing capacitors 402-$a$ and 402-$b$ by referring RC filters 410 and 420 to a virtual ground, in accordance with one embodiment of the present invention.

FIG. 5 shows four-switch buck boost converter 500 which eliminates DC bias voltages at sensing capacitors 402-$a$ and 402-$b$ by referring RC filters 410 and 420 to a virtual ground, in accordance with one embodiment of the present invention. As shown in FIG. 5, rather than connecting sensing capacitors 402-$a$ and 402-$b$ to system ground, sensing capacitors 402-$a$ and 402-$b$ are coupled to a virtual ground, which may be a different reference voltage, depending on the operation mode. For example, in the buck mode (i.e., the operating mode in which switch 308 is always conducting), the virtual ground may be coupled to output voltage $V_{OUT}$. In the boost mode (i.e., in the operating mode in which switch 305 is always conducting), the virtual ground may be coupled to input voltage $V_{IN}$. In the buck-boost mode, the virtual ground may be controlled to track the average voltage of nodes SW1 and SW2. Decoupling capacitor 501 maintains the voltage at the virtual ground during any mode switching, and transient voltage excursions. In four-switch buck boost converter 500 of FIG. 5, the resistors 401-$a$ and 401-$b$ and sensing capacitors 402-$a$ and 402-$b$ are also designed to match the time constant of inductor current $i_L$ (i.e., $L/R_{DCR}=R_sC_s$; see FIG. 5). The virtual ground is preferably well-maintained during buck-boost mode, so as to avoid any error due to mismatch of sensing capacitors 402-$a$ and 402-$b$ during transients. Again sensing capacitors 402-*a* and 402-*b* should be well-matched to avoid transient errors in buck-boost mode operations.

Figure 6:
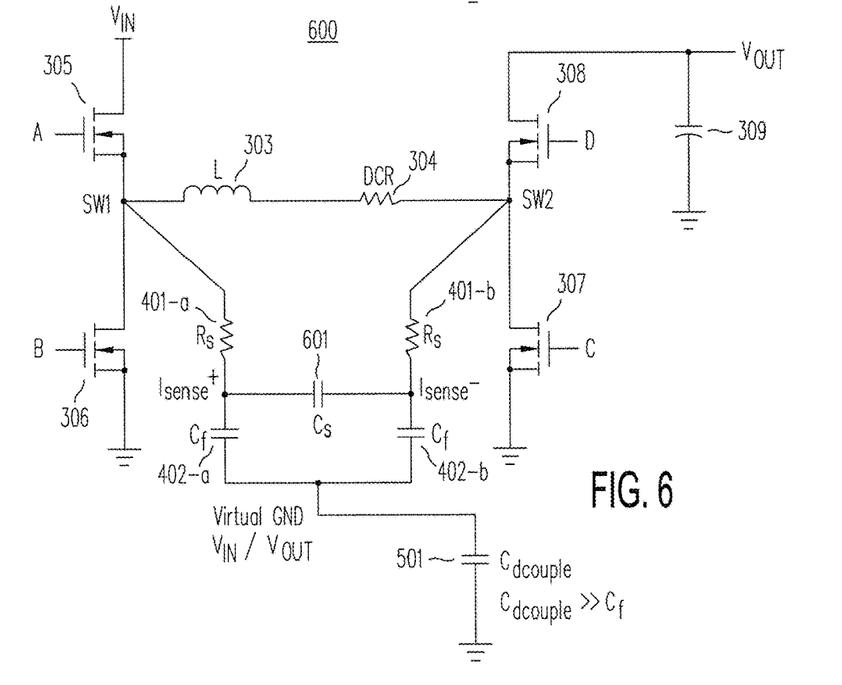
FIG. 6 shows four-switch buck boost converter 600 which provides more robust performance than four-switch buck boost converter 500 of FIG. 5 when operating in buck-boost mode, in accordance with one embodiment of the present invention.

FIG. 6 shows four-switch buck boost converter 600 which provides more robust performance than four-switch buck boost converter 500 of FIG. 5 when operating in buck-boost mode, in accordance with one embodiment of the present invention. Four-switch buck boost converter 600 improves transient performance by including sensing capacitor 601 (with a capacitance $C_s$) in addition to sensing capacitors 402-*a* and 402-*b*, which are each now provided a capacitance $C_f$). In four-switch buck boost converter 600, the time constant of inductor current $i_L$ is matched according to the equation $$\frac{L}{R_{DCR}} = 2R_S\left(C_S + \frac{C_f}{2}\right)$$

(See, FIG. 6). In this equation, the term inside the parentheses may be designed such that capacitance $C_s$ of capacitor 601 is dominant (i.e., capacitance $C_f$ is selected to be much less than capacitance $C_s$), so as to allow capacitance $C_s$ to match the time constant in the inductor current. Because this approach reduces the sensitivity to sensing capacitors 402-*a* and 402-*b*, any effect arising from a mismatch in capacitance between capacitors 402-*a* and 402-*b* is significantly minimized.

A simulation was performed to investigate the modified DCR current-sensing method in four-switch buck boost converter 600 of FIG. 6. In this simulation, inductor 303 is provided an inductance L=4.7 uH, DC resistance $R_{DCR}$=10 mΩ, sensing resistor 401-*a* and 401-*b* are each provided resistance $R_S$=33.33 kΩ, and sensing capacitor 601 is provided a nominal capacitance $C_S$ of 0.0047 uF, capacitors 402-*a* and 402-*b* are provided capacitances of 0.0037 uF and 0.0057 uF, respectively, to simulate a 10% mismatch of nominal capacitance $C_f$ between capacitors 402-*a* and 402-*b*. In this simulation, four-switch buck-boost converter 600 is operated in buck-boost mode. The input voltage is initially ramped up from 0 volts to 10 volts over 0.1 ms, is then maintained at 10 volts for 0.4 ms, and then allowed to rise to 13 volts over 0.15 ms, where it is held until 2.0 ms. During that period, the output voltage is initially at zero, but rises to about 15 volts by 0.7 ms, and is regulated at that level until 1.3 ms, when it is abruptly grounded. The difference between the current in inductor 303 and the measured current based on the voltage drop across capacitor 601 is found to be insignificant throughout the simulation period. The 10% mismatch in capacitors 402-*a* and 402-*b* is estimated to cause a transient voltage of less than 4 mV across sense capacitor 601.

Figure 7:
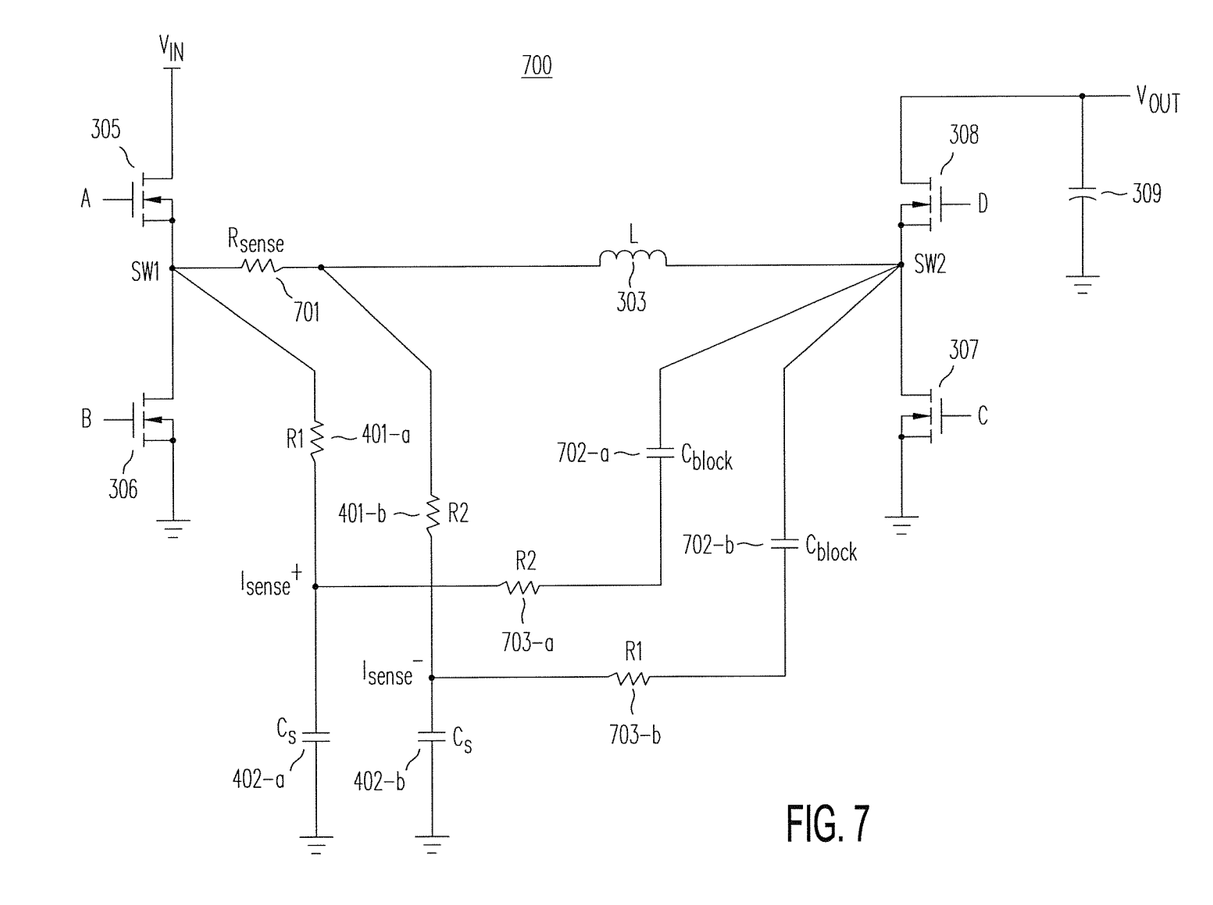
FIG. 7 shows four-switch buck-boost converter 700 using sensing resistor 701, rather than the DC resistance of induc-tor 303, to sense the current in inductor 303, in accordance with one embodiment of the present invention.

For high precision operations, a sensing resistor may be provided in place of DCR 304 (i.e., the DC resistance of inductor 303), as the DC resistance of an inductor is less reliable. FIG. 7 shows four-switch buck-boost converter 700 using sensing resistor 701 to sense the current in inductor 303, in accordance with one embodiment of the present invention. As shown in FIG. 7, sensing resistor 701, with a resistance $R_{sense}$, is connected in series with inductor 303 (resistor 701 may be connected to either node SW1 or node SW2, i.e., on either side of inductor 303). The terminals of sensing resistor 701 are each respectively coupled to ground through serially connected RC circuits formed by sensing resistors 401-*a* and 401-*b* and sensing capacitors 402-*a* and 402-*b*. In addition, resistors 703-*a* and 703-*b* and blocking capacitors 702-*a* and 702-*b* form two RC circuits that respectively connect nodes $I_{sense+}$ and $I_{sense-}$ to node SW2 at the terminal of inductor 303 away from sensing resistor 701. Blocking capacitors 702-*a* and 702-*b* are each selected to have a capacitance $C_{block}$ that is much less than the capacitance $C_S$ in each of sensing capacitor 402-*a* and 402-*b*. As shown in FIG. 7, resistors 401-*a* and 703-*b* both have a resistance $R_1$ and resistors 401-*b* and 703-*a* both have a resistance $R_2$. In this configuration, capacitance $C_S$ and resistor values $R_1$ and $R_2$ may be selected such that the RC time constant of resistor 401-*b* and sensing capacitor 402-*b* can be matched to the inductor 303

$$\left(\text{i.e., } \frac{L}{DCR} = R_2 C_S\right),$$

while the resistance relationship $$\frac{R_2}{R_1} - 1 = \frac{R_{sense}}{DCR}$$

holds (see, FIG. 7). The voltage drop $V_{sense}$ across nodes $I_{sense+}$ and $I_{sense-}$ is given by the product of inductor current $i_L$ and sensing resistance $R_{sense}$.

Figure 8:
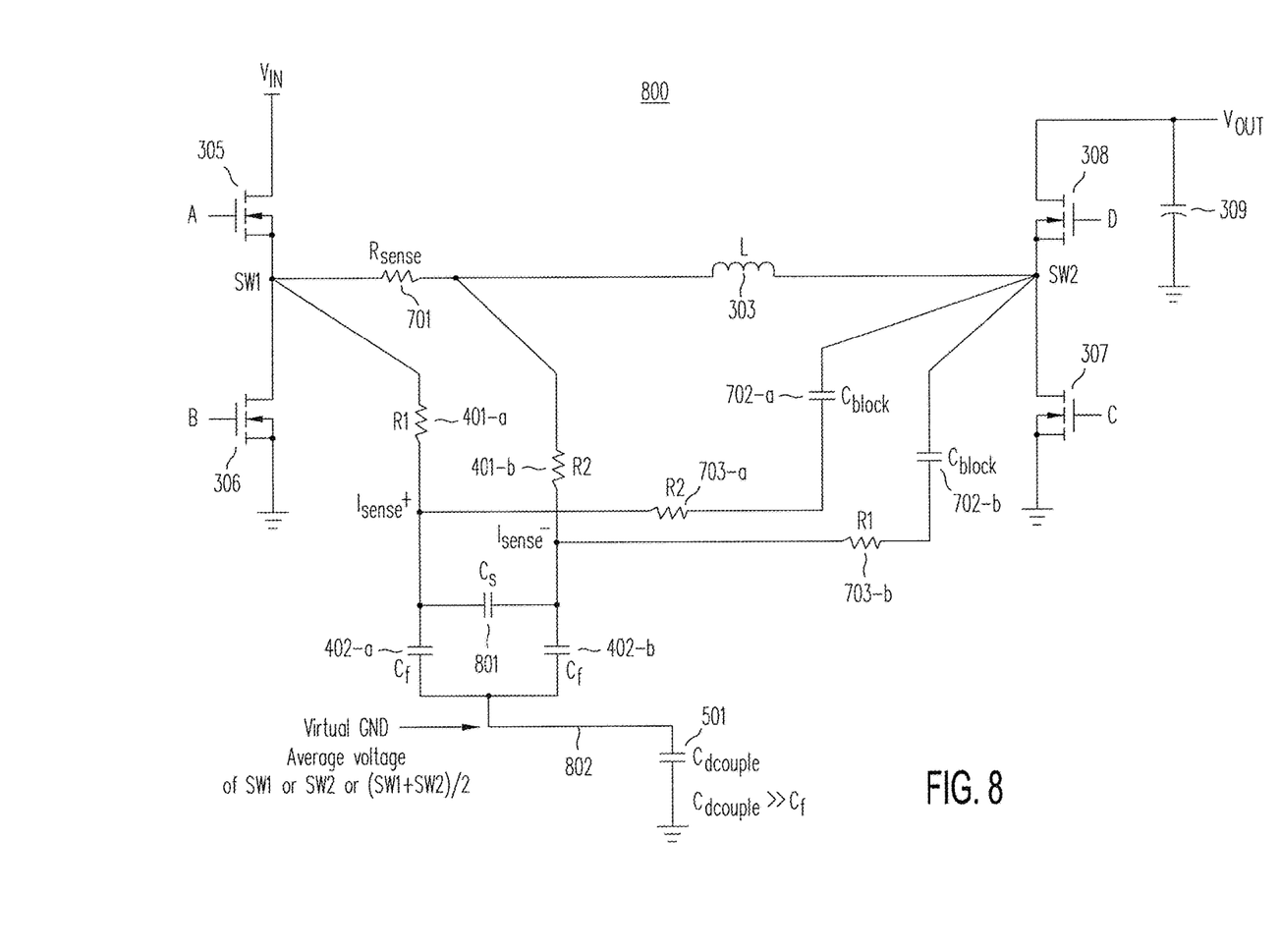
FIG. 8 shows four-switch buck-boost converter 800, which provides sensing capacitor 801 across nodes $I_{sense+}$ and $I_{sense-}$ and a virtual ground node 802, according to one embodiment of the present invention.

The virtual ground technique and the technique of providing a sensing capacitor across $I_{sense+}$ and $I_{sense-}$ to avoid the effects of a capacitance mismatch in capacitors 402-*a* and 402-*b*, as discussed above with respect to FIGS. 5 and 6, may also be applicable to four-switch buck-boost converter 700 of FIG. 7. FIG. 8 shows four-switch buck-boost converter 800, which provides sensing capacitor 801 across nodes $I_{sense+}$ and $I_{sense-}$ and virtual ground node 802, according to one embodiment of the present invention. As shown in FIG. 8, decoupling capacitor (with capacitance $C_{dcouple}$) isolates virtual ground node 802 from the true ground reference. The voltage at virtual ground node 802 may be controlled to be equal to the average voltage at node SW1, node SW2, or their average $$\frac{(V_{SW1} + V_{SW2})}{2}.$$

In this configuration of four-switch buck-boost converter 800 of FIG. 8, by choosing sensing capacitance $C_S$ to be greater than capacitance $C_f$ in each of capacitors 402-*a* and 402-*b* and much less than capacitance $C_{block}$, the time constant of inductor 303 is matched according to the equation $$\frac{L}{DCR} = R_2\left(C_S + \frac{C_f}{2}\right),$$

while the resistance relationship $$\frac{R_2}{R_1} - 1 = \frac{R_{sense}}{DCR}$$

holds. The voltage drop $V_{sense}$ across nodes $I_{sense+}$ and $I_{sense-}$ is given by the product of inductor current $i_L$ and sensing resistance $R_{sense}$ (see, FIG. 8). Of course, as in four-switch buck-boost converter 700 of FIG. 7, resistor 701 may be connected to either node SW1 or node SW2, i.e., on either side of inductor 303.

The present invention is applicable to any application that requires inductor current-sensing, such as sensing an average inductor current. The methods illustrated in FIGS. 4-6 may be used to modify an inductor current through high-pass or low-pass filtering, thus providing a lossless method to sense a continuous inductor current without incurring a DC error. Methods of the present invention are suitable for use in both voltage-mode or current-mode control of a four-switch buck boost converter. The present invention may be implemented in an integrated circuit.

The above-detailed description is provided to illustrate the specific embodiments of the present invention and is not intended to be limiting. Various modifications and variations within the scope of the present invention are possible. The present invention is set forth in the following claims.

We claim:

1. An inductor current-sensing circuit for measuring a current in an inductor having an inductance and an equivalent DC resistance, comprising:
   a sensing resistor connected in series with the inductor;
   a first RC network coupled between a first terminal of the sensing resistor and a reference voltage source, the reference voltage source providing a virtual ground reference;
   a second RC network coupled between a second terminal of the sensing resistor and the virtual ground reference; and
   a decoupling capacitor connecting the virtual ground reference to a system ground reference.

2. The inductor current-sensing circuit of claim 1, wherein the first RC network and the second RC network each have a time constant substantially equal to a ratio between the inductance and the DC resistance.

3. The inductor current-sensing circuit of claim 1, wherein the first RC network comprises:
   a sensing capacitor having a first terminal and a second terminal, the second terminal being coupled to the reference voltage source;
   a first resistor coupled between the first terminal of the sensing resistor and the first terminal of the sensing capacitor;
   a blocking capacitor having a first terminal and a second terminal, the second terminal of the blocking capacitor being coupled to one terminal of the inductor; and
   a second resistor coupled between the first terminal of the sensing capacitor and the first terminal of the blocking capacitor.

4. The inductor current-sensing circuit of claim 3, wherein the second RC network comprises:
   a sensing capacitor having a first terminal and a second terminal, the second terminal being coupled to the reference voltage source;
   a first resistor coupled between the second terminal of the sensing resistor and the first terminal of the sensing capacitor of the second RC network;
   a blocking capacitor having a first terminal and a second terminal, the second terminal of the blocking capacitor of the second RC network being coupled to one terminal of the inductor; and
   a second resistor coupled between the first terminal of the sensing capacitor of the second RC network and the first terminal of the blocking capacitor of the second RC network.

5. The inductor current-sensing circuit of claim 4, wherein a ratio in resistance value between the second resistor of the second RC network and the first resistor of the second resistor network less one is substantially a ratio in resistance value between the sensing resistor and the equivalent DC resistance of the inductor.

6. The inductor current-sensing circuit of claim 4, wherein the blocking capacitor in each of the first and the second RC networks has a capacitance that is greater than a capacitance of the sensing capacitor in the corresponding one of the first and second RC networks.

7. The inductor current-sensing circuit of claim 1, wherein the inductor is a primary inductor of a four-switch buck boost converter receiving an input voltage and providing an output voltage.

8. The inductor current-sensing circuit of claim 7, wherein the virtual ground reference refers to the output voltage when the four-switch buck boost converter operates in a buck mode.

9. The inductor current-sensing circuit of claim 7, wherein the virtual ground reference refers to the input voltage when the four-switch buck boost converter operates in a boost mode.

10. The inductor current-sensing circuit of claim 7, wherein the virtual ground reference refers to an average of a voltage across a first terminal of the sensing resistor and one terminal of the inductor, when the four-switch buck boost converter operates in a buck-boost mode.

11. The inductor current-sensing circuit of claim 1, further comprising an additional sensing capacitor connected between the first RC network and the second RC network.

12. The inductor current-sensing circuit of claim 11, wherein the additional sensing capacitor has a greater capacitance than a capacitance of the sensing capacitor in each of the first and the second RC networks.

13. A method for measuring a current in an inductor having an inductance and an equivalent DC resistance, comprising:
   connecting a sensing resistor in series with the inductor;
   coupling a first RC network between a first terminal of the sensing resistor and a reference voltage source, the reference voltage source providing a virtual ground reference;
   coupling a second RC network between a second terminal of the sensing resistor and the virtual voltage reference;
   measuring a voltage between a node in the first RC network and a node in the second RC network; and
   connecting a decoupling capacitor between the virtual ground reference and a system ground reference.

14. The method of claim 13, wherein the first RC network and the second RC network each have a time constant substantially equal to a ratio between the inductance and the DC resistance.

15. The method of claim 13, wherein the first RC network comprises:
   a sensing capacitor having a first terminal and a second terminal, the second terminal being coupled to the reference voltage source;
   a first resistor coupled between the first terminal of the sensing resistor and the first terminal of the sensing capacitor;
   a blocking capacitor having a first terminal and a second terminal, the second terminal of the blocking capacitor being coupled to one terminal of the inductor; and
   a second resistor coupled between the first terminal of the sensing capacitor and the first terminal of the blocking capacitor.

16. The method of claim 13, wherein the second RC network comprises:
- a sensing capacitor having a first terminal and a second terminal, the second terminal being coupled to the reference voltage source;
- a first resistor coupled between the second terminal of the sensing resistor and the first terminal of the sensing capacitor of the second RC network;
- a blocking capacitor having a first terminal and a second terminal, the second terminal of the blocking capacitor of the second RC network being coupled to one terminal of the inductor; and
- a second resistor coupled between the first terminal of the sensing capacitor of the second RC network and the first terminal of the blocking capacitor of the second RC network.

17. The method of claim 16, wherein measuring the voltage comprises measuring across the first terminal of the sensing capacitor in the first RC network and the first terminal of the sensing capacitor in the second RC network.

18. The method of claim 16, wherein ratio in resistance value between the second resistor of the second RC network and the first resistor of the second resistor network less one is substantially a ratio in resistance value between the sensing resistor and the equivalent DC resistance of the inductor.

19. The method of claim 16, wherein the blocking capacitor in each of the first and the second RC networks has a capacitance that is greater than a capacitance of the sensing capacitor in the corresponding one of the first and the second RC networks.

20. The method of claim 13, wherein the inductor is a primary inductor of a four-switch buck boost converter receiving an input voltage and providing an output voltage.

21. The method of claim 20, wherein the virtual ground reference refers to the output voltage when the four-switch buck boost converter operates in a buck mode.

22. The method of claim 20, wherein the virtual ground reference refers to the input voltage when the four-switch buck boost converter operates in a boost mode.

23. The method of claim 20, wherein the virtual ground reference refers to an average of a voltage across a first terminal of the sensing resistor and one terminal of the inductor, when the four-switch buck boost converter operates in a buck-boost mode.

24. The method of claim 13, further comprising connecting an additional sensing capacitor between the first RC network and the second RC network.

25. The inductor current-sensing circuit of claim 24, wherein the additional sensing capacitor has a greater capacitance than a capacitance of the sensing capacitor in each of the first and the second RC networks.

* * * * *